United States Patent

[11] 3,616,181

[72] Inventor Joseph P. Stalego
 Newark, Ohio
[21] Appl. No. 874,384
[22] Filed Nov. 5, 1969
[45] Patented Oct. 26, 1971
[73] Assignee Owens-Corning Fiberglas Corporation
 Continuation-in-part of application Ser. No. 783,432, Dec. 12, 1968, now abandoned.

[54] MOLDABLE ARTICLE OF GLASS FIBERS AND A MODIFIED PHENOLIC BINDER
 14 Claims, No Drawings
[52] U.S. Cl. ..................................................... 161/170,
 65/4, 117/126 GR, 156/167, 156/335, 260/17.2,
 260/29.3, 260/51.5, 264/136
[51] Int. Cl. ..................................................... D04h 3/12,
 C08g 5/00
[50] Field of Search ............................................. 161/170;
 65/3.4; 156/167, 335; 260/17.2, 29.3, 838, 840,
 51.5; 117/161 L, 126 GR; 264/136

[56] References Cited
UNITED STATES PATENTS

| | | | |
|---|---|---|---|
| 1,827,591 | 10/1931 | Lawrence.................. | 260/17.2 |
| 2,722,521 | 11/1955 | Shaw et al.................. | 260/17.2 |
| 3,158,519 | 11/1964 | Shannon et al. ............. | 260/29.3 |
| 3,215,585 | 11/1965 | Kneipple ..................... | 260/29.3 |
| 3,322,702 | 5/1967 | Smucker et al. .............. | 260/29.3 |

Primary Examiner—Robert F. Burnett
Assistant Examiner—Linda M. Carlin
Attorneys—Staelin & Overman and Thomas R. Schuman

ABSTRACT: A moldable article comprising a woollike mass of intermeshed glass fibers bonded to one another at points of contact by a phenolic binder. The binder is substantially dry and curable, and comprises from 40 percent to 91 percent of a curable phenol-formaldehyde condensate, from 4 percent to 40 percent of urea and from 5 percent to 45 percent of dicyandiamide. Preferably, the binder additionally contains a thickening agent, as well as a siloxane or other release agent and emulsified petroleum oil to minimize sticking and resin build-up during molding of the article.

3,616,181

MOLDABLE ARTICLE OF GLASS FIBERS AND A MODIFIED PHENOLIC BINDER

This application is a continuation-in-part of my copending application Ser. No. 783,432 filed Dec. 12, 1968 and now abandoned.

BACKGROUND OF THE INVENTION

Various articles comprising a woollike mass with intermeshed glass fibers and a phenolic binder have been known for some time, and have been used, for example, in the production of molded pipe insulation and automotive crash pads. The previously known moldable articles of the indicated type, however, have had comparatively short storage lives because cure of the binder proceeded at a relatively rapid rate, even under ambient conditions. In addition, such articles have been difficult to handle because the binder was a viscous, tacky liquid which adhered to itself and to other articles, e.g. interleaving in a roll. Finally, molding of such articles was difficult and time consuming because resin buildup in matched molds occurred to such an extent, after only a few hours of molding, that detail of the mold was not reproduced in the final article. As a consequence, molds had to be cleaned frequently.

THE PRESENT INVENTION

The instant invention is based upon the discovery of an improved binder for a moldable article comprising a woollike mass of intermeshed glass fibers and a binder. The improved binder comprises a phenol-formaldehyde condensate, urea and dicyandiamide. The urea and dicyandiamide are present in the binder in such proportion that the binder, when dehydrated, is stable at 100° F. for at least 1 month, and the proportion of dicyandiamide is sufficiently high to increase the viscosity and to cause a substantial reduction in the tack of the binder. Preferably, the binder additionally contains an amount of at least one thickening agent sufficient to increase the viscosity, body and film strength thereof, and a siloxane or other release agent and an emulsified petroleum oil.

OBJECTS

It is an object of the invention to provide an improved moldable article comprising a woollike mass of intermeshed glass fibers bonded to one another at points of contact by a substantially dry, curable, phenolic binder.

It is a further object of the invention to provide such a moldable article wherein the binder comprises a phenol-formaldehyde condensate, urea and dicyandiamide.

It is still another object of the invention to provide such a moldable article wherein the binder additionally contains a thickening agent in an amount sufficient to increase the viscosity, body and film strength thereof.

It is another object of the invention to provide such a moldable article wherein the binder contains a mold release agent.

Other objects and advantages will be apparent from the description which follows, which is intended only to illustrate and disclose, and in no way to limit, the invention.

The following examples are presented solely for the purpose of further illustrating and disclosing, and are in no way to be construed as limitations on, the invention.

EXAMPLE I

A phenolic binder for use in producing a moldable article according to the invention was produced in an agitated, 1000-gallon, jacketed, steel mixing kettle. The following ingredients were used to produce the binder: water, as required, Silane A* subseqcuntly described. 5 3/5 pounds, ammonium sulfate 18 pounds, urea 180 pounds, dicyandiamide 176 pounds, Thickening Agent B* 9.1 pounds, bone glue 89 pounds, ammonium hydroxide, as required, Phenolic Resin C* 1074 pounds, and Silicone Release Agent D* 26 3/5 pounds.

The mixing kettle was first charged with 175 gallons of water, and agitation was then commenced, and was continued until production of the binder was complete. Steam was then circulated through the jacket of the mixing kettle until the water therein reached a temperature of 160° F. The Thickening Agent B was then added sufficiently slowly to prevent lumping. Fifteen minutes after the addition of the Thickening Agent B was complete, the Silane A, the ammonium sulfate, the urea and the dicyandiamide and water, as required to bring the volume in the mixing kettle to 370 gallons, were added and steam was circulated in the jacket to bring the temperature of the partial charge to 130° F. The bone glue was then added to the mixing kettle, and steam was circulated through the jacket, as required, to maintain the temperature of the partial charge at 130° F. until a uniform dispersion substantially free of lumps and particles was obtained. A pH adjustment was then made by adding approximately 3 gallons of 28 percent 6 The terms "percent" and "parts" are used herein and in the appended claims to refer to percent and parts by weight, unless otherwise indicated.ammonium hydroxide, and the Phenolic Resin C was then added, together with a total of approximately 9 additional gallons of 28 percent ammonium hydroxide. The pH of the binder was checked periodically during the addition of the Phenolic Resin C, and the total amount of ammonium hydroxide used was that necessary to provide a pH of 8.5 after completion of the addition of the Phenolic Resin C. The Silicone Release Agent D was then added to the mixing kettle, followed by water, as required to provide a total of 500 gallons. The complete binder was then agitated for an additional 15 minutes, and was used as described below to produce a moldable article according to the invention.

The binder, produced as described above, was sprayed into a forming hood through which newly-formed glass fibers were being projected downwardly onto a foraminous conveyor so that a woollike mass of intermeshed glass fibers with associated binder was collected on the conveyor. The proportion of binder to glass fibers was adjusted so that the binder, on a dry solids basis, constituted approximately 17 percent of the total weight of fibers and binder. The nominal diameter of the specific fibers used in this procedure was twenty-six hundred-thousandths of an inch. A vacuum box was used under the conveyor in the forming hood to facilitate deposition of the fibers and associated binder, and, also, to aid in evaporating some of the moisture from the binder. The woollike mass, as collected on the foraminous conveyor, was at a temperature of about 180° F. It was then conveyed through an unheated oven at an ambient temperature of about 75° F., and in which it cooled, in a period of approximately 5 minutes, to a temperature of about 130° F. Upon emergence from the unheated oven, the woollike mass was sensibly dry (moisture content of about 1½ percent), and the binder was a substantially nontacky solid. The woollike moldable article was then compressed to an apparent density of about 10 pounds per cubic foot (original density about one-half pound per cubic foot and thickness about 4 ½ inches), and rolled with waxed paper interleaving. Kraft paper may also be used.

Silane A had the formula:

Thickening Agent B is composed of approximately 1 part of locust bean gum and 1 part of a xanthomanas hydrophilic colloid. Xanthomanas hydrophilic colloid is a biosynthetic polysaccharide composed of glucose, mannose and glucuronic acid in a molar ratio of 2:1:1; there is one acetyl group for approximately each one-fourth unit of the polymer. Thickening Agent B is, therefore, a polysaccharide thickening agent; it is commercially available under the designation "Kelgum."

Phenolic Resin C was produced from 51.15 parts of 52 percent formaldehyde, 31 parts of phenol, 2.4 parts of barium oxide, 10.83 parts of water and sulfuric acid, as required. The formaldehyde and the phenol were first charged into a suitable reactor and mixed. The barium oxide was then dissolved in the water, and the resulting solution was charged into the reactor. The reaction mixture was then heated for two hours at 100° F., 1½ hours at 110° F., two hours at 125° F. and approximately 5 hours at 140° F. The reaction mixture was cooled to 90° F. when the free formaldehyde content thereof reached 4.6 percent, and sulfuric acid was then added to lower the pH to 7.3. Phenolic Resin C had a solids content of 45.5 percent, and a stroke cure of 115 seconds. Silicone Release Agent D was essentially a methylpolysiloxane, with some ethyl groups; it is commercially available under the trade designation "UCY-5 287" or "L-49."

Molded ceiling tiles have been produced from the moldable article produced as described in example 1. The tiles, approximately one foot square, with opposed stapling tabs, and approximately one-sixteenth inch thick, were molded in matched dies of appropriate contour, maintained at a temperature of 525° F., using a molding cycle of 45 seconds. The moldable article was merely unrolled, cut to approximate size and inserted in the mold; no difficulty was encountered in handling, because the article did not adhere appreciably to the interleaving, and because the cut mold charges were sufficiently rigid that they could be handled readily without deformation and did not stick to one another in stacks. It has been found that, on the average, 8,400 molding cycles can be carried out before there is sufficient resin build-up in a single mold to require cleaning thereof.

For purposes of comparison, a moldable article was produced generally as described above, but using a binder composed of water, Silane A, ammonium sulfate, Phenolic Resin C and an oil emulsion, plus sufficient ammonium hydroxide to bring the pH thereof to 8.5. The moldable article produced from this binder is difficult to handle because it sticks to interleaving in a roll, and because stacks or precut mold charges adhered to one another. In addition, the material is difficult to handle because it is limp and fluffy. Finally, resin build-up in molds is much more rapid, a maximum of about 4,800 cycles being possible before mold cleaning is necessary, even when the molds are pretreated with a silicone release agent before use and a polytetrafluoroethylene release agent is sprayed on the mold surfaces after approximately each 15 molding cycles.

In the procedure described in example 1, above, the Phenolic Resin C, the urea and the dicyandiamide were all added separately to a mixing kettle in producing the binder. It has been found that all or a part of the urea and of the dicyandiamide can be combined with a phenolic resin, and can even be partially cocondensed therewith, so that all or a part of the urea and all or a part of the dicyandiamide can be combined with the phenolic resin prior to formulation of a binder. An illustrative procedure for producing a moldable article according to the invention wherein all of the urea and a part of the dicyandiamide are first combined with a phenolic resin, and the resulting combination is then used in formulating a binder is described in example 2, below.

EXAMPLE 2

A phenolic binder for use in producing a moldable article according to the invention was produced as described in example 1, above, from 45 ounces of Silane A, 8¾ pounds of ammonium sulfate, 80 pounds of dicyandiamide, 4½ pounds of Thickening Agent B, 50 pounds of bone glue, 64 gallons of Phenolic Resin E, 15½ pounds of Silicone Release Agent B, water sufficient to make a total of 250 gallons and ammonium hydroxide as required to adjust the final pH of the binder to 8.5. Moldable articles were produced from glass fibers and the binder produced as described in this paragraph hereof, and by the method generally described in example 1, above. The resulting moldable articles were found to be substantially equivalent to those produced as described in example 1.

Phenolic Resin E was produced from 52 parts of 52 percent formaldehyde, 27.3 parts of phenol, 8.2 parts of water, 4 parts of barium monohydrate, 2.7 parts of dicyandiamide, 4.1 parts of urea, and sulfuric acid as required for a pH adjustment. The phenol, the formaldehyde and the water were first charged to a suitable, agitated reactor, and were heated for a total of 3 hours at 100° F. The barium monohydrate was added stepwise during the first two hours of heating at 100° F. The temperature of the reaction mixture was then increased to 120° F. and maintained thereat for 1½ hours, and was then increased to 140° F. and maintained thereat until the end of the cook cycle. When the free formaldehyde content reached 7.0 percent, the dicyandiamide was added to the reaction mixture; one hour after the start of the dicyandiamide addition, the urea was added and, 30 minutes later, the reaction mixture was cooled to 100° F. and sulfuric acid was added, as required, to bring the pH to 7.2.

In the binders produced as described in examples 1 and 2, above, the Silicone Release Agent D was used for the purpose of minimizing resin build-up during a final molding step and also to facilitate removal of the molded article from the mold. Accordingly, this ingredient can be eliminated altogether whenever it is desired to carry out the final molding step in such a manner that resin buildup is not a problem, for example, because temporary molds are used for only a few cycles, or because permanent molds which have been treated so that the resin does not adhere thereto are used. Where the release function is desired, it has been found that various methyl polysiloxanes can be substituted for the Silicone Release Agent D, for example those available under the designations DC-22, LE-46, LE-48, XF-1-1011A, and HV-490, the last being an emulsion from 100,000 centistoke viscosity dimethylpolysiloxane. It has also been found that the monoethanolamide of ricinoleic acid can be substituted for the Silicone Release Agent D, and with substantially equivalent results. The specific amide that has been used as a release agent had an acid value of 5, and iodine value of 80, a hydroxyl value of 295, a saponification value of 15, a specific gravity of 1.000 (25/25), a penetration hardness of 90 and a melting point of 40° C.

The bone glue and the Thickening Agent B in the binders produced as described in examples 1 and 2 are both thickening or gelling agents which increase the viscosity, body and film strength of the binder. Such thickening agents, or equivalents therefor, are preferably employed in binders for producing moldable articles according to the invention. However, the urea and dicyandiamide in such a binder cause solidification upon substantial dehydration: even without a thickening or gelling agent such moldable articles are significantly improved because of greater stiffness and reduced tackiness by comparison with previously-known binders. Other thickening agents can be substituted for the bone glue and for the Thickening Agent B specifically disclosed in examples 1 and 2. While the optimum amount of the thickening agent or thickening agents depends upon the identity thereof, it usually ranges from about 2 percent to about 35 percent, based upon the weight of the phenol-formaldehyde condensate, urea and dicyandiamide, on a dry solids basis. Examples of other operable thickening agents include methyl cellulose, alginates, gelatin and various acrylic-thickening agents, which may be emulsion polymers, solutions or dispersions.

Urea and dicyandiamide in a binder of an article according to the invention also stabilize the binder at 100° F. for a minumum of one month in the sense that satisfaction moldings can be produced from articles according to the invention which have been maintained at 100° F. for one month. This is another respect in which an article according to the invention is significantly superior to previously-known similar articles which would become useless for molding purposes after only a few days at 100° F.

It has also been found that a significant increase in the number of molding cycles performed before mold cleaning is required, can be attained by including in a binder of this invention an emulsified petroleum oil along with a methylpolysiloxane such as Silicone Release Agent D, described above and commercially available under the trade designation "UCY-5287" or "L-49." An illustrative procedure for formulating such a binder is described in the following example 3.

EXAMPLE 3

A phenolic binder for use in producing a moldable article according to the invention was produced as described in example 1, above, from 6.75 pounds of Silane A, 27 pounds of ammonium sulfate, 634 pounds of dicyandiamide, 9.3 pounds of Thickening Agent B, 1,899 pounds (solids) or 388 gallons of Phenolic Resin E, 103 pounds of an emulsified petroleum oil, 26.7 pounds of Silicone Release Agent D, water sufficient to make a total of 1,500 gallons and ammonium hydroxide as required to adjust the final pH of the binder to 8.5. Moldable articles were produced from glass fibers and the binder produced as described in this paragraph hereof, and by the method generally described in example 1, above. The resulting moldable article was found to be substantially equivalent to that produced as described in example 1.

Molded ceiling tiles were produced from the moldable article as described in example 1. It was found that superior resistance to resin build-up in the molds was obtained using this example 3 formulation. After approximately 25,000 molding cycles of 40 to 60 second duration at about 525° F. the molds were clean and shiny and exhibited no resin build-up.

The petroleum oil used in this formulation is commercially available as "Shell 230" and has a flash point higher than 585° F. The petroleum oil was emulsified with a synthetic petroleum sulfonate commercially available as "Morpel X914" and an emulsifying agent commercially available as "Triton X114." Emulsification of the petroleum sulfonate oil renders it compatible with phenol-formaldehyde resin.

Any commercially available petroleum oil may be used so long as its flash point exceeds the temperature attained during the molding cycle employed; this, of course, prevents flashing off of the oil during the molding step.

In its essential details, the instant invention comprises a moldable article which is a woollike mass of intermeshed glass fibers bonded to one another at points of contact by a substantially dry, curable, phenolic binder. The phenolic binder comprises from 40 percent to 91 percent of a curable phenol-formaldehyde condensate, from 4 percent to 40 percent of urea, and from 5 percent to 45 percent of dicyandiamide, based upon the total of phenol-formaldehyde condensate, urea and dicyandiamide. The proportion of urea dicyandiamide in the binder is sufficiently high that the dehydrated binder is stable at 100° F. for at least one month, and the proportion of dicyandiamide is sufficiently high that the binder is substantially nontacky. The dicyandiamide makes the binder substantially nontacky probably in part by virtue of its crystallization. In general, the binder in a moldable article according to the invention can constitute from about 5 percent to about 45 percent of the weight of the article. The optimum percentage of the binder depends upon fiber diameter and the physical properties desired. In general, the smaller the fiber diameter, the greater the proportion of binder required, and vice versa, because the amount of binder required is a function of the total fiber surface in the moldable article. The apparent density of an article according to the invention, for example, when compression packaged, can vary substantially depending upon the degree of compression, and usually ranges from about ½ pound to about 30 pounds per cubic foot. Preferably, the binder of an article according to the invention contains an amount of at least one thickening agent sufficient appreciably to increase the viscosity, body and film strength thereof; the thickening agent may constitute as little as one-fifth percent or as much as 35 percent, depending upon its specific identity and preferably, particularly when the thickening agent is a combination of bone glue and a polysaccharide, ranges from about 0.55 percent to about 27 percent, in all cases based upon the total dry solids of phenolic resin, urea and dicyandiamide.

Ideally, the binder in an article according to the invention additionally contains a release agent and an emulsified petroleum oil. The release agent is employed usually in an amount ranging from about one-half percent to about 10 percent, based upon the total weight of the phenol-formaldehyde condensate, urea and dicyandiamide; methylpolysiloxanes and the monoethanolamine of ricinoleic acid are examples of advantageous release agents. The emulsified petroleum oil is used generally in an amount ranging from about 1 to 10 percent, based upon the total phenol-formaldehyde condensate, urea and dicyandiamide. Preferred and optimum proportions of binders for articles according to the invention are set forth in table I, below:

TABLE I

|  | Preferred Percentage** | Optimum Percentage** |
|---|---|---|
| Phenol-formaldehyde condensate* | 60 to 75 | 65 to 70 |
| Urea | 5 to 20 | 10 |
| Dicyandiamide | 10 to 35 | 20 to 25 |
| Bone Glue | 1/2 to 20 | 1 |
| Polysaccharide thickening agent | 0.1 to 1 | 1 |
| Mold release agent | 0.25 to 3 | 1 |
| Emulsified petroleum oil | up to 10 | 2 to 6 |

*Preferably a resole, initial mole ratio of formaldehyde to phenol from about 2.5:1 to about 3.5:1.
**Based upon total of phenol-formaldehyde, urea and dicyandiamide on a dry solids basis.

It will be apparent that various changes and modifications can be made from the specific details set forth herein without departing from the spirit and scope of the invention as defined in the appended claims.

What I claim is:

1. A moldable article comprising a woollike mass of intermeshed glass fibers bonded to one another at points of contact by a substantially dry, curable, phenolic binder, said phenolic binder comprising from 40 percent to 91 percent of a curable phenol-formaldehyde condensate, from 4 percent to 40 percent of urea and from 5 percent to 45 percent of dicyandiamide, based upon the total of phenol-formaldehyde condensate, urea and dicyandiamide, the proportion of urea and dicyandiamide in said binder being sufficiently high that the dehydrated binder is stable at 100° F. for at least one month, and the proportion of dicyandiamide being sufficiently high to increase the viscosity and to cause a substantial reduction in the tack of the binder.

2. A moldable article as claimed in claim 1 wherein the binder constitutes from about 5 percent to about 45 percent of the weight of the article.

3. A moldable article as claimed in claim 2 having an apparent density from about one-half pound to about 30 pounds per cubic foot.

4. A moldable article as claimed in claim 3 wherein the binder contains an amount of at least one thickening agent sufficient appreciably to increase the viscosity, body and film strength thereof.

5. A moldable article as claimed in claim 4 wherein the thickening agent comprises from one-half percent to about 25 percent of a polysaccharide, based upon the total weight of phenol-formaldehyde condensate, urea and dicyandiamide.

6. A moldable article as claimed in claim 4 wherein the thickening agent comprises from one-half percent to 25 percent of bone glue, based upon the total weight of phenol-formaldehyde condensate, urea and dicyandiamide.

7. A moldable article as claimed in claim 6 wherein the thickening agent additionally comprises from about 0.1 to about 1 percent of a polysaccharide supplemental thickening agent, based upon the total weight of the phenol-formaldehyde condensate, urea and dicyandiamide.

8. A moldable article as claimed in claim 5 wherein the binder includes, based upon the total weight of phenol-formaldehyde condensate, urea and dicyandiamide, from about 0.25 percent to about 3 percent of release agent effective to prevent adhesion between a heated mold surface and the binder during cure of the latter in contact with the former.

9. A moldable article as claimed in claim 8 wherein the binder includes, based upon the total weight of phenol-formaldehyde condensate, urea and dicyandiamide, from about 1 percent to about 10 percent of an emulsified petroleum oil.

10. A moldable article as claimed in claim 7 wherein the binder includes, based upon the total weight of phenol-formaldehyde condensate, urea and dicyandiamide, from about 0.25 percent to about 3 percent of release agent effective to prevent adhesion between a heated mold surface and the binder during cure of the latter in contact with the former.

11. A moldable article as claimed in claim 8 wherein the release agent is selected from the group consisting of methylpolysiloxane fluids and the monoethanolamide of ricinoleic acid.

12. A moldable article as claimed in claim 9 wherein the release agent is selected from the group consisting of methypolysiloxane fluids and the monoethanolamide of ricinoleic acid.

13. A method of making a moldable article comprising the steps of:
   a. forming glass fibers from molten steams of glass;
   b. projecting said fibers toward a collecting surface;
   c. introducing a curable phenolic binder into said projected fibers, wherein said phenolic binder comprises from 40 percent to 91 percent of a curable phenol-formaldehyde condensate, from 4 percent to 40 percent of urea and from 5 percent to 45 percent of dicyandiamide, based upon the total of phenol-formaldehyde condensate, urea and dicyandiamide;
   d. depositing said projected fibers in association with said binder into a woollike mass of intermeshed fibers on said collecting surface;
   e. converting said binder associated with said woollike mass of fibers to a substantially nontacky, but uncured, state; and
   f. associating said woollike mass with an interleaving material whereby said woollike mass can be stored, shipped or otherwise handled prior to molding.

14. A method of making a molded article comprising the steps of:
   a. forming glass fibers from molten streams of glass;
   b. projecting said fibers toward a collecting surface;
   c. introducing a curable phenolic binder into said projected fibers, wherein said phenolic binder comprises from 40 percent to 91 percent of a curable phenol-formaldehyde condensate, from 4 percent to 40 percent of urea and from 5 percent to 45 percent of dicyandiamide, based upon the total of phenol-formaldehyde condensate, urea and dicyandiamide;
   d. depositing said projected fibers in association with said binder into a woollike mass of intermeshed fibers on said collecting surface;
   e. converting said binder associated with said woollike mass of fibers to a substantially nontacky, but uncured, state;
   f. compressing said woollike mass to an apparent density of about 0.5 to about 30 pounds per cubic foot;
   g. cutting said woollike mass into the approximate size and shape of the molded article; and
   h. molding said woollike mass with heated molding means at a temperature sufficient to cure said binder to a hardened, infusible state and thereby produce the molded article.

* * * * *